(12) United States Patent
Matsuno et al.

(10) Patent No.: US 11,280,004 B2
(45) Date of Patent: Mar. 22, 2022

(54) WATER-BASED TREATMENT SOLUTION, CHEMICAL CONVERSION TREATMENT METHOD, AND CHEMICAL-CONVERSION-TREATED STEEL SHEET

(71) Applicant: Nippon Steel Nisshin Co., Ltd., Tokyo (JP)

(72) Inventors: Masanori Matsuno, Osaka (JP); Shin Ueno, Osaka (JP)

(73) Assignee: Nippon Steel Nisshin Co., Ltd., Tokyo (JP)

( * ) Notice: Subject to any disclaimer, the term of this patent is extended or adjusted under 35 U.S.C. 154(b) by 255 days.

(21) Appl. No.: 16/608,874

(22) PCT Filed: May 19, 2017

(86) PCT No.: PCT/JP2017/018775
§ 371 (c)(1),
(2) Date: Oct. 28, 2019

(87) PCT Pub. No.: WO2018/198384
PCT Pub. Date: Nov. 1, 2018

(65) Prior Publication Data
US 2020/0087792 A1   Mar. 19, 2020

(30) Foreign Application Priority Data
Apr. 26, 2017   (JP) .............................. JP2017-087331

(51) Int. Cl.
C23C 22/34   (2006.01)
C23C 22/68   (2006.01)

(52) U.S. Cl.
CPC .............. *C23C 22/34* (2013.01); *C23C 22/68* (2013.01)

(58) Field of Classification Search
None
See application file for complete search history.

(56) References Cited

U.S. PATENT DOCUMENTS

| 10,619,069 B2 * | 4/2020 | Matsuno .............. C09D 127/12 |
| 2013/0157076 A1 | 6/2013 | Matsuno et al. |
| 2013/0160898 A1 | 6/2013 | Matsuno et al. |
| 2017/0096573 A1 | 4/2017 | Matsuno et al. |

FOREIGN PATENT DOCUMENTS

| CN | 101124084 | 2/2008 | |
| EP | 1298380 | 4/2003 | |
| JP | 07-224391 | 8/1995 | |
| JP | 2003-003280 | 1/2003 | |
| JP | 2003-105563 | 4/2003 | |
| JP | 2005-254106 | 9/2005 | |
| JP | 2012-021207 | 2/2012 | |
| JP | 2012-177146 | 9/2012 | |
| JP | 2012-177147 | 9/2012 | |
| JP | 2016-121390 | 7/2016 | |
| WO | WO 2011/158513 | 12/2011 | |
| WO | WO 2011/158516 | 12/2011 | |
| WO | WO-2015146188 A1 * | 10/2015 | ............. B32B 27/36 |

OTHER PUBLICATIONS

Examination Report Under Sections 12 & 13 of the Patents Act, 1970 and the Patents Rules, 2003 dated Mar. 31, 2021 From the Government of India, Intellectual Property India, Patents, designs, Trade Marks, Geographical Indications, The Patent Office Re. Application No. 201917045799. (5 Pages).

* cited by examiner

*Primary Examiner* — Alexander M Weddle

(57) ABSTRACT

The purpose of the present invention is to provide a water-based treatment solution which makes it possible to form a chemical-conversion-treated coating film having further improved corrosion resistance. The present invention relates to a water-based treatment solution for a chemical conversion treatment of a steel sheet or a plated steel sheet. The water-based treatment solution contains an organic resin including a fluororesin, a Group-4A metal compound, and at least one binding promoter selected from the group consisting of dimethyl adipate, diethyl adipate, di(iso)propyl adipate, di(iso)butyl adipate, dimethyl phthalate, diethyl phthalate, di(iso)propyl phthalate and di(iso)butyl phthalate.

13 Claims, No Drawings

WATER-BASED TREATMENT SOLUTION, CHEMICAL CONVERSION TREATMENT METHOD, AND CHEMICAL-CONVERSION-TREATED STEEL SHEET

RELATED APPLICATIONS

This application is a National Phase of PCT Patent Application No. PCT/JP2017/018775 having International filing date of May 19, 2017, which claims the benefit of priority of Japanese Patent Application No. 2017-087331 filed on Apr. 26, 2017. The contents of the above applications are all incorporated by reference as if fully set forth herein in their entirety.

FIELD AND BACKGROUND OF THE INVENTION

The present invention relates to a water-based treatment solution, a chemical conversion treatment method, and a chemical-conversion-treated steel sheet.

Steel sheets, and plated steel sheets where steel sheet surfaces are processed with Zn-based plating have been conventionally used for various applications of external building materials and the like. Such a Zn-based plated steel sheet may be insufficient in corrosion resistance, discoloration resistance, and/or the like as it is, and thus a chemical conversion film including an organic resin may be formed on the surface of the steel sheet.

Such steel sheet and plated steel sheet are also often used in processed articles such as a round tube, a square tube, a C-channel, an H-shaped steel, and an L-shaped steel. In the case of processing of such a Zn-based plated steel sheet, a chemical conversion film may be formed, for example, for the purpose of an enhancement in galling resistance before processing such as bending, welding and spraying (pre-coating system). On the other hand, a chemical conversion film may also be formed after processing (post-coating system) because defects may be generated on a chemical conversion film in processing and an edge face generated by cutting of such a steel sheet cannot be pre-coated. In addition, such a plated steel sheet may be processed to thereby cause a substrate steel sheet to be exposed, and a chemical conversion film may also be formed on the exposed portion of the substrate steel sheet, according to a post-coating system.

As a treatment solution for use in formation of a chemical conversion film according to a post-coating system, PTL 1 describes an acrylic lacquer mainly including esters of acrylic acid or methacrylic acid and also including a copolymer resin obtained by reacting vinyl monomers such as styrene and vinyl acetate.

As the treatment solution, PTL 2 describes an aqueous solution in which an organic corrosion inhibitor selected from unsaturated alcohols, saturated straight primary amines, saturated straight secondary amines, saturated straight tertiary amines, thioureas, phosphonic acids, morpholines, and imidazolines is dissolved.

As the treatment solution, PTL 3 describes a solution including a titanate-based coupling agent having three or more hydrophobic groups having 5 or more carbon atoms.

The acrylic lacquer described in PTL 1 includes an organic solvent, resulting in a need for recover of the solvent volatilized. The treatment solutions described in PTL 2 and PTL 3 each cause a thin chemical conversion film to be formed, and thus are inferior in anticorrosion properties and cannot allow an anticorrosion effect to be maintained for a long period in some cases.

An aqueous treatment solution including an aqueous organic resin such as an aqueous fluororesin may be then used to form a thicker chemical conversion film. Furthermore, PTLS 4 to 8 each describe a chemical conversion treatment solution which can allow an organic resin film including a fluororesin to be enhanced in water resistance by crosslinking of the fluororesin with a compound including a group 4 metal.

CITATION LIST

Patent Literatures

PTL 1
Japanese Patent Application Laid-Open No. HEI 7-224391
PTL 2
Japanese Patent Application Laid-Open No. 2003-3280
PTL 3
Japanese Patent Application Laid-Open No. 2005-254106
PTL 4
International Publication WO 2011/158513
PTL 5
International Publication WO 2011/158516
PTL 6
Japanese Patent Application Laid-Open No. 2012-21207
PTL 7
Japanese Patent Application Laid-Open No. 2012-177146
PTL 8
Japanese Patent Application Laid-Open No. 2012-177147

SUMMARY OF THE INVENTION

Technical Problem

The chemical conversion treatment solution including a fluororesin and a group 4 metal, as described in each of PTLS 4 to 8, is very useful because a chemical conversion film formed by use of such a solution can be more enhanced in water resistance thereof. Respective processed articles of the steel sheet and the plated steel sheet are used in various outdoor environments, and thus not only water resistance, but also more suppression of generation of red rust (an enhancement in corrosion resistance) is still demanded.

In view of the above problems, an object of the present invention is to provide a water-based treatment solution that can allow for formation of a chemical conversion film more enhanced in corrosion resistance, a chemical conversion treatment method using the water-based treatment solution, and a chemical-conversion-treated steel sheet having a chemical conversion film formed by the chemical conversion treatment method.

Solution to Problem

In consideration of the problems mentioned above, one aspect of the present invention relates to a water-based treatment solution for a chemical conversion treatment of a steel sheet or a plated steel sheet. The water-based treatment solution includes: an organic resin comprising a fluororesin, a compound containing group 4 element, and at least one binding promoter selected from the group consisting of dimethyl adipate, diethyl adipate, di(iso)propyl adipate, di(iso)butyl adipate, dimethyl phthalate, diethyl phthalate, di(iso)propyl phthalate, and di(iso)butyl phthalate.

Another aspect of the present invention relates to a method for chemical conversion treatment of a steel sheet or a plated steel sheet. The method includes applying a water-based treatment solution to a surface of a steel sheet or a plated steel sheet. The water-based treatment solution includes: an organic resin comprising a fluororesin, a compound containing group 4 element and at least one binding promoter selected from the group consisting of dimethyl adipate, diethyl adipate, di(iso)propyl adipate, di(iso)butyl adipate, dimethyl phthalate, diethyl phthalate, di(iso)propyl phthalate, and di(iso)butyl phthalate.

Still another aspect of the present invention relates to a chemical-conversion-treated steel sheet includes: a steel sheet or a plated steel sheet; and a chemical conversion film formed on a surface of the steel sheet or the plated steel sheet. The chemical conversion film includes: an organic resin comprising a fluororesin; a compound containing group 4 element; and at least one binding promoter selected from the group consisting of dimethyl adipate, diethyl adipate, di(iso)propyl adipate, di(iso)butyl adipate, dimethyl phthalate, diethyl phthalate, di(iso)propyl phthalate, and di(iso)butyl phthalate.

Advantageous Effects of Invention

According to the present invention, a water-based treatment solution that can allow for formation of a chemical conversion film more enhanced in corrosion resistance, a chemical conversion treatment method using the water-based treatment solution, and a chemical-conversion-treated steel sheet having a chemical conversion film formed by the chemical conversion treatment method are provided.

DESCRIPTION OF SPECIFIC EMBODIMENTS OF THE INVENTION

The present inventors have made intensive studies, and as a result, have found that a chemical conversion film formed is more enhanced in weather resistance by allowing a specified compound (hereinafter, also simply referred to as "binding promoter") to be further contained in a water-based treatment solution including an organic resin including a fluororesin, and a compound containing group 4 element. The present inventors have made further studies about the effect which imparts such an enhancement in weather resistance, and as a result, have found that dimethyl adipate, diethyl adipate, di(iso)propyl adipate, di(iso)butyl adipate, dimethyl phthalate, diethyl phthalate, di(iso)propyl phthalate, and di(iso)butyl phthalate can be used in the binding, promoter, thereby leading, to completion of the present invention.

In the present invention, "(iso)propyl" means propyl and isopropyl, and "(iso)butyl" means butyl and isobutyl.

The binding promoter can soften a fluororesin that is usually present, as an emulsion, in a water-based treatment solution. It is considered that the fluororesin softened by the binding promoter is more easily fused to form a chemical conversion film higher in water resistance, thereby allowing for a more enhancement in weather resistance of the chemical conversion film.

1. Water-Based Treatment Solution

The water-based treatment solution includes an organic resin including a fluororesin, a compound containing group 4 element, and the binding promoter. The water-based treatment solution may further include other component(s) such as an etching agent.

1-1. Organic Resin

The organic resin is an organic resin including a fluororesin. The fluororesin can enhance weather resistance (ultraviolet light resistance, light resistance, and the like) and corrosion resistance (prevention of red rust, and the like) of a chemical conversion film. The organic resin may include any resin other than the fluororesin as long as a chemical conversion film is not remarkably deteriorated in weather resistance and corrosion resistance.

The fluororesin is roughly classified to a solvent-based fluororesin and a water-based fluororesin. In particular, a water-based fluororesin is preferably used which is easily used for a water-based treatment solution not having any problem about recover of a solvent volatilized.

The water-based fluororesin means a fluororesin having a hydrophilic functional group. Preferable examples of the hydrophilic functional group include a carboxyl group and a sulfonic acid group, and salts thereof. Examples of such a salt of a carboxyl group or a sulfonic acid group include an ammonium salt, an amine salt, and an alkali metal salt.

The amount of the hydrophilic functional group in the water-based fluororesin is preferably an amount of 0.05 mass % or more and 5 mass % or less. A fluororesin where the amount of the hydrophilic functional group is 0.05 mass % or more and 5 mass % or less can provide a water-based emulsion with almost no use of any emulsifier. A chemical conversion film including almost no emulsifier can be a chemical conversion film excellent in water resistance.

The content of the hydrophilic functional group in the water-based fluororesin may be determined by dividing the total molar mass of the hydrophilic functional group included in the water-based fluororesin, by the number average molecular weight of the water-based fluororesin. The molar mass of a carboxyl group is 45 and the molar mass of a sulfonic acid group is 81, and thus the total molar mass of the hydrophilic functional group included in the water-based fluororesin is determined by determining the respective numbers of carboxyl groups and sulfonic acid groups included in the water-based fluororesin, and multiplying the numbers with the molar masses, respectively. The number average molecular weight of the water-based fluororesin can be measured by GPC.

While a carboxyl group in the water-based fluororesin is taken together with the surface of a steel sheet (or a plated layer or an underlying chemical conversion film) to thereby form a hydrogen bond or the like, thereby contributing to an enhancement in adhesiveness of a chemical conversion film to the surface of a steel sheet or a plated layer (or an underlying chemical conversion film), $H^+$ is hardly dissociated to thereby cause a crosslinking reaction with the compound containing group 4 element to hardly occur. While a sulfonic acid group in the water-based fluororesin allows H to be easily dissociated, the group may be strong in the action of adsorption to a water molecule to thereby cause water resistance of a chemical conversion film to be remarkably deteriorated, if remaining as an unreacted group in the film without any crosslinking reaction with the compound containing group 4 element. Accordingly, the water-based fluororesin preferably includes both a carboxyl group and a sulfonic acid group in order to take advantage of respective characteristics. In such a case, the ratio of a carboxyl group and a sulfonic acid group is preferably in the range of 5 or more and 60 or less in terms of the molar ratio of carboxyl group/sulfonic acid group.

The number average molecular weight of the water-based fluororesin is preferably 1,000 or more, more preferably 10,000 or more, particularly preferably 200,000 or more.

The lower limit of the number average molecular weight of the water-based fluororesin can be any value as described above, thereby allowing water permeability and water resistance of a chemical conversion film to be sufficiently enhanced and inhibiting a steel sheet or a plated steel sheet from corroding due to penetration of moisture and/or corrosive gas through a chemical conversion film. In addition, the lower limit of the number average molecular weight of the water-based fluororesin can be any value as described above, thereby allowing a radical generated by the action of light energy or the like to hardly act on a polymer chain terminal, to thereby inhibit a chemical conversion film from being degraded due to hydrolysis of the water-based fluororesin by interaction of water or the like. An increase in molecular weight of the water-based fluororesin can lead to an increase in intermolecular force and an enhancement in cohesion force of a chemical conversion film, thereby leading to a more enhancement in water resistance of a chemical conversion film. In addition, an increase in molecular weight of the water-based fluororesin can also lead to stabilization of binding between atoms in a main chain of the water-based fluororesin, thereby hardly causing a chemical conversion film to be degraded due to hydrolysis of the water-based fluororesin.

On the other hand, the number average molecular weight of the water-based fluororesin is preferably 2,000,000 or less. The upper limit of the number average molecular weight of the water-based fluororesin is 2,000,000 or less, thereby allowing gelling of the water-based treatment solution to hardly occur, resulting in a more enhancement in storage stability of the water-based treatment solution.

The water-based fluororesin preferably includes 8 mass % or more of a fluorine (F) atom based on the total mass of the fluororesin, from the viewpoint of more enhancements in weather resistance and corrosion resistance of a chemical conversion film. The water-based fluororesin also preferably includes 20 mass % or less of a fluorine (F) atom based on the total mass of the fluororesin, from the viewpoint of facilitation of paint formation and more enhancements in adhesiveness and drying properties of a chemical conversion film. The content of a fluorine (F) atom in the water-based fluororesin can be measured by use of an X-ray fluorescence analyzer.

The water-based fluororesin is preferably a fluorine-containing olefin resin. Examples of the fluorine-containing olefin resin include a copolymer of a fluoroolefin and a hydrophilic functional group-containing monomer.

Examples of the fluoroolefin include tetrafluoroethylene, trifluoroethylene, chlorotrifluoroethylene, hexafluoropropylene, vinyl chloride, vinylidene fluoride, pentafluoropropylene, 2,2,3,3-tetrafluoropropylene, 3,3,3-trifluoropropylene, bromotrifluoroethylene, 1-chloro-1,2-difluoroethylene, and 1,1-dichloro-2,2-difluoroethylene. Such a fluoroolefin may be used singly or in combinations of two or more kinds thereof. Among such fluoroolefins, for example, perfluoroolefins including tetrafluoroethylene and hexafluoropropylene, and vinylidene fluoride are preferable from the viewpoint of a more enhancement in ultraviolet light resistance. The content of any fluoroolefin containing chlorine, such as chlorotrifluoroethylene, is preferably low (for example, 0.1 mol % or less) from the viewpoint of suppression of corrosion due to a chlorine ion.

Examples of the hydrophilic functional group-containing monomer include known carboxyl group-containing monomer and sulfonic acid group-containing monomer. Such a hydrophilic functional group-containing monomer may be used singly or in combinations of two or more kinds thereof.

One example of the carboxyl group-containing monomer includes an unsaturated carboxylic acid represented by the following formula (1), and unsaturated carboxylic acids including an ester or an acid anhydride thereof.

[Formula 1]

(1)

In the formula, $R^1$, $R^2$ and $R^3$ independently represent a hydrogen atom, an alkyl group, a carboxyl group or an ester group; and n is an integer of 0 to 20.

Specific examples of the unsaturated carboxylic acid represented by the formula (1) include acrylic acid, methacrylic acid, vinyl acetic acid, crotonic acid, cinnamic acid, itaconic acid, an itaconic acid monoester, maleic acid, a maleic acid monoester, fumaric acid, a fumaric acid monoester, 5-hexenoic acid, 5-heptenoic acid, 6-heptenoic acid, 7-octenoic acid, 8-nonenoic acid, 9-decenoic acid, 10-undecylenoic acid, 11-dodecylenoic acid, 17-octadecylenoic acid, and oleic acid.

Other examples of the carboxyl group-containing monomer include a carboxyl group-containing vinyl ether monomer represented by the following formula (2).

[Formula 2]

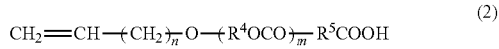

(2)

In the formula, $R^4$ and $R^5$ independently represent a saturated or unsaturated, straight or cyclic alkyl group; n is 0 or 1; and m is 0 or 1.

Specific examples of the carboxyl group-containing vinyl ether monomer represented by the formula (2) include 3-(2-allyloxyethoxycarbonyl)propionic acid, 3-(2-allyloxybutoxycarbonyl)propionic acid, 3-(2-vinyloxyethoxycarbonyl)propionic acid, and 3-(2-vinyloxybutoxycarbonyl)propionic acid.

Specific examples of the sulfonic acid group-containing monomer include vinylsulfonic acid, allylsulfonic acid, methallylsulfonic acid, styrenesulfonic acid, 2-acrylamide-2-methylpropanesulfonic acid, 2-methacryloyloxyethanesulfonic acid, 3-methacryloyloxypropanesulfonic acid, 4-methacryloyloxybutanesulfonic acid, 3-methacryloyloxy-2-hydroxypropanesulfonic acid, 3-acryloyloxypropanesulfonic acid, allyloxybenzenesulfonic acid, methallyloxybenzenesulfonic acid, isoprenesulfonic acid, and 3-allyloxy-2-hydroxypropanesulfonic acid.

The copolymer of a fluoroolefin and a hydrophilic functional group-containing monomer may be, if necessary, further copolymerized with other copolymerizable monomer. Examples of such other copolymerizable monomer include carboxylic acid vinyl esters, alkyl vinyl ethers, and non-fluoroolefins.

The carboxylic acid vinyl esters can enhance compatibility of the water-based fluororesin and gloss of a chemical conversion film, and can increase the glass transition temperature. Examples of the carboxylic acid vinyl esters include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl p-t-butylbenzoate.

The alkyl vinyl ethers can enhance gloss and flexibility of a chemical conversion film. Examples of the alkyl vinyl ethers include methyl vinyl ether, ethyl vinyl ether, and butyl vinyl ether.

The non-fluoroolefins can enhance flexibility of a chemical conversion film. Examples of the non-fluoroolefins include ethylene, propylene, n-butene, and isobutene.

For example, the monomer can be copolymerized by an emulsion polymerization method, thereby providing an emulsion of a fluoroolefin copolymer having a hydrophilic functional group. The amount of a fluoroolefin in a raw material monomer composition can be here adjusted so that the fluoroolefin copolymer has a hydrophilic functional group in an amount of 0.05 mass % or more and 5 mass % or less, thereby allowing a water-based emulsion of the fluoroolefin copolymer to be produced with almost no use of any emulsifier. A chemical conversion film formed using an emulsion of a fluoroolefin copolymer containing almost no emulsifier (1 mass % or less) includes almost no emulsifier, and thus exhibits almost no deterioration in water resistance due to the remaining emulsifier and exerts excellent water resistance.

The fluororesin prepared according to the above method is considered to be present, as a particle, even in the water-based treatment solution. The emulsion of the fluororesin preferably has an average particle size of 50 nm or more and 300 nm or less. The emulsion can have an average particle size of 50 nm or more, resulting in an enhancement in storage stability of the water-based treatment solution. The emulsion can have an average particle size of 300 nm or less, resulting in an increase in surface area of the emulsion to thereby facilitate mutual fusion and more facilitate film formation in baking at a low temperature (for example, 55° C.). For example, the emulsion can have an average particle size in the above range by optimization of the shear rate and the stirring time in preparation of the emulsion according an emulsion polymerization method.

The content of the fluororesin in the water-based treatment solution is preferably 10 parts by mass or more and 70 parts by mass or less based on 100 parts by mass of water. The content of the fluororesin is 10 parts by mass or more, thereby allowing a chemical conversion film to be more hardly deteriorated in film formability and denseness due to evaporation of a large amount of water in a drying process. On the other hand, the content of the fluororesin is 70 parts by mass or less, thereby allowing the water-based treatment solution to be more enhanced in storage stability.

The content of the fluororesin in the water-based treatment solution is preferably 70 mass % or more and 99 mass % or less based on the total amount of a solid (a component except for water and other solvent).

Compound Containing Group 4 Element

The compound containing group 4 element easily reacts with a functional group such as a carboxyl group or a sulfonic acid group in the fluororesin, in particular, the water-based fluororesin, and promotes a caring or crosslinking reaction of the water-based fluororesin, Thus, the compound containing group 4 element can enhance water resistance of a chemical conversion film even in low-temperature drying.

The compound containing group 4 element can be any of oxoate, fluoride, hydroxide, an organic acid salt, carbonate, peroxide, an ammonium salt, an alkali metal salt, an alkali earth metal salt, and the like of a group 4A metal. The oxoate here means a salt of an acid (carbonic acid, sulfuric acid, or the like) having oxygen and other element. Examples of the oxoate include a hydroacid salt, carbonate, and sulfate.

Examples of the compound containing group 4 element include a titanium (Ti) compound, a zirconium (Zr) compound, and a hafnium (Hf) compound. In particular, a zirconium compound is preferable from the viewpoint of suppression of deterioration in weather resistance of a photocatalyst described below.

The compound containing group 4 element hardly causes weathering degradation of a chemical conversion film due to oxidation, hydrolysis, and the like of an ester bond, a formether bond, and the like, unlike a melamine resin. The compound containing group 4 element also hardly causes weathering degradation of a chemical conversion film due to cutting of a crosslinked structure by an acidic substance such as a sulfuric acid ion, a nitric acid ion, and the like contained in acid rain, unlike a melamine resin.

The compound containing group 4 element also hardly causes progression of weathering degradation due to cutting of a crosslinked structure because the compound allows the fluororesin to be crosslinked by a stronger binding force than a urethane bond to be formed in a crosslinked portion with an isocyanate resin.

The compound containing group 4 element also enhances film adhesiveness, water resistance and discoloration resistance of a chemical conversion film. For example, in the case where a chemical conversion film is formed by the water-based treatment solution including the compound containing group 4 element, on the surface, of an Al-containing Zn-based alloy plated steel sheet, deterioration in film adhesiveness due to robust Al oxide present in the surface of the plated steel sheet can be suppressed. In addition, in the case where a chemical conversion film is formed by the water-based treatment solution including the compound containing group 4 element, on the surface of an Al-containing Zn-based alloy plated steel sheet, a reaction product produced by a reaction of an Al ion eluted by an etching reaction or the like, with the compound containing group 4 element, is enriched at the interface between a plated layer and the chemical conversion film, resulting in enhancements in the initial corrosion resistance and discoloration resistance of the plated steel sheet.

The content of the compound containing group 4 element in the water-based treatment solution, in terms of metal, can be, for example, 0.5 g/L, and is preferably 2 g/L or more from the viewpoint of a more enhancement in adhesiveness of a chemical conversion film by sufficient crosslinking of the water-based fluororesin. The content of the compound containing group 4 element is more preferably 1 g/L or more, further preferably 2 g/L or more from the above viewpoint. The content of the compound containing group 4 element in the water-based treatment solution is preferably 30 g/L or less from the viewpoint of suppression of deteriorations in processability and weather resistance of a chemical conversion film due to an increase in porosity of such a chemical conversion film. The content of the compound containing group 4 element in the water-based treatment solution, in terms of metal, can be measured with an X-ray fluorescence analyzer.

1-3. Binding Promoter

The binding promoter can soften the fluororesin present in the water-based treatment solution. The fluororesin softened by the binding promoter allows a particle forming the emulsion to be easily fused more tightly, resulting in formation of a chemical conversion film through which water more hardly penetrates. Thus, a chemical conversion film formed from the water-based treatment solution including the binding promoter is considered to hardly cause generation of red rust and thus be more enhanced in corrosion resistance. The binding promoter can fuse the fluororesin well even at about ordinary temperature, by the above-mentioned action. Thus, the water-based treatment solution including the binding promoter can allow a chemical conversion film to be more easily formed on an exposed region of a substrate steel sheet, generated by cutting of a steel sheet or a plated steel sheet at a processing site or the like, processing of such a plated steel sheet, or the like, without any heating at such a processing site.

The binding promoter here used can be any of dimethyl adipate, diethyl adipate, di(iso)propyl adipate, di(iso)butyl adipate, dimethyl phthalate, diethyl phthalate, di(iso)propyl phthalate, di(iso)butyl phthalate, and the like. Among such binding promoters, dimethyl adipate, diethyl adipate, di(iso)propyl adipate, and di(iso)butyl adipate are preferable from the viewpoint of corrosion resistance and an appearance to be treated.

The content of the binding promoter in the water-based treatment solution can be, for example, 0.1 g/L or more and 50 g/L or less, and is preferably 0.5 g/L or more and 50 g/L or less, more preferably 0.7 g/L or more and 30 g/L or less, further preferably 1 g/L or more and 15 g/L or less from the viewpoint of a more enhancement in corrosion resistance of a chemical conversion film due to easier fusion of the fluororesin by the above action.

1-4. Etching Agent

The etching agent homogenizes and activates the surface of a substrate steel sheet, resulting in a more enhancement in adhesiveness of a chemical conversion film and thus suppression of penetration of water from the chemical conversion film into a steel sheet or a plated steel sheet. Thus, a chemical conversion film, which is formed from the water-based treatment solution including the binding promoter, is considered to hardly cause generation of red rust and be more enhanced in corrosion resistance.

Specifically, the etching agent dissolves metal components such as Zn and Al contained in a plated layer, and Fe contained in a substrate steel sheet, and allows such metal components dissolved to be taken in a chemical conversion film, resulting in an enhancement in corrosion resistance of a steel sheet or a plated steel sheet on which such a chemical conversion film is formed. It is here considered in the present invention that the metal components taken are taken in a more inside portion of an emulsion-like fluororesin by the above binding promoter to thereby more enhance also adhesiveness of a chemical conversion film, resulting in a more enhancement in corrosion resistance of a steel sheet or a plated steel sheet on which such a chemical conversion film is formed.

In particular, the etching agent is preferably phosphoric acid or phosphate, and ammonia or an ammonium salt from the viewpoint of activation of an exposed region of a substrate steel sheet.

The phosphoric acid or phosphate homogenizes and activates iron (Fe) in an exposed region of a substrate steel sheet and zinc (Zn) contained in Zn-based plating. Thus, the phosphoric acid or phosphate is particularly useful for a steel sheet and a Zn-based plated steel sheet.

The phosphoric acid or phosphate may be any water-soluble compound having a phosphate anion ($PO_4^{3-}$). Examples of such phosphate include sodium phosphate, ammonium phosphate, ammonium hydrogen phosphate, ammonium dihydrogen phosphate, magnesium phosphate, potassium phosphate, manganese phosphate, zinc phosphate, orthophosphoric acid, metaphosphoric acid, pyrophosphoric acid, triphosphoric acid, and tetraphosphoric acid. Such phosphoric acid or phosphate may be used singly or in combinations of two or more kinds thereof.

The ammonia acid or ammonium salt homogenizes and activates iron (Fe) in an exposed region of a substrate steel sheet and aluminum (Al) contained in Al-based plating or Zn—Al-based plating. Thus, the phosphoric acid or phosphate is particularly useful for a steel sheet and a Zn—Al-based plated steel sheet.

Examples of the ammonium salt include phosphate, fluoride and a metal salt of a quaternary ammonium cation ($NH_4^+$). In particular, it is preferable to include phosphate of a quaternary ammonium cation, and it is more preferable to include ammonium phosphate, ammonium hydrogen phosphate and ammonium dihydrogen phosphate.

The water-based treatment solution preferably includes both the phosphoric acid or phosphate and the ammonia or ammonium salt from the viewpoint of applicability of a single water-based treatment solution to various steel sheets and plated steel sheets (for example, Zn-based, Al-based, Zn—Al-based, and Zn—Al—Mg-based steel sheets). The water-based treatment solution preferably includes both the phosphoric acid or phosphate and the ammonia or ammonium salt also from the viewpoint of a more enhancement in the effect of homogenization and activation of the surface of a substrate steel sheet and a more enhancement in weather resistance of a chemical conversion film. The etching agent is preferably phosphate of a quaternary ammonium cation, more preferably ammonium phosphate, ammonium hydrogen phosphate, and ammonium dihydrogen phosphate, from such viewpoints.

The content of the etching agent in the water-based treatment solution is preferably 1 g/L or more, further preferably 2 g/L or more in terms of phosphate anion, with respect to the content of a phosphate anion ($PO_4^{3-}$). Alternatively, the content of the etching agent in the water-based treatment solution is preferably 1 g/L or more, further preferably 2 g/L or more in terms of quaternary ammonium cation, with respect to the content of a quaternary ammonium cation ($NH_4^+$).

The content of the etching agent in the water-based treatment solution, in the case where the etching agent includes both the phosphoric acid or phosphate and the ammonia or ammonium salt, is preferably 1 g/L or more, further preferably 2 g/L or more in terms of phosphate anion and in terms of quaternary ammonium cation, with respect to the respective contents of a phosphate anion ($PO_4^{3-}$) and a quaternary ammonium cation ($NH_4^+$).

1-5. Other Component(s)

As other component(s), an inorganic compound, an organic lubricant such as a silane coupling agent, an inorganic lubricant, an inorganic pigment, an organic pigment, and a dye, other than the above, may be, if necessary, added to the water-based treatment solution. An inorganic compound (oxide, phosphate, or the like) of Mg, Ca, Sr, V, W. Mn, B, Si, Sn, or the like densifies a chemical conversion film and enhances water resistance. Organic lubricants such as fluorine-based, polyethylene-based, and styrene-based lubricants, and inorganic lubricants such as molybdenum disulfide and talc enhance lubricity of a chemical conversion film. Addition of an inorganic pigment, an organic pigment, a dye, or the like can impart predetermined color tone to a chemical conversion film.

The contents of a vanadium (V) ion and a titanium (Ti) ion in the water-based treatment solution are each preferably 500 ppm or less, in terms of metal. A compound containing V and Ti may be used as an anticorrosion agent, and the contents of such ions can be lower to thereby inhibit weather resistance of a chemical conversion film from being deteriorated by the photocatalyst action of V and Ti.

The content of chromium (Cr), in particular, hexavalent chromium in the water-based treatment solution is preferably 100 ppm or less in terms of metal. The content of Cr (hexavalent chromium) can be lower to thereby allow for formation of a chemical conversion film which has less effect on human bodies and which is high in safety.

The water-based treatment solution preferably does not substantially include an inorganic pigment, an organic pigment, a dye, and the like from the viewpoint of formation of a clear film. The water-based treatment solution mainly includes the fluororesin, and thus can form a clear film, unlike any case of a phosphate treatment (Parkerizing) for formation of a phosphate film from a manganese or iron salt of phosphoric acid, or of a zinc-rich paint for formation of a sacrificial anticorrosion layer from a large amount of a zinc powder.

In the case where a silane coupling agent is added to the water-based treatment solution, the content of the silane coupling agent in the water-based treatment solution is preferably 0.5 parts by mass or more and 5 parts by mass or less based on 100 parts by mass of the fluororesin. The content of the silane coupling agent can be 0.5 parts by mass or more, resulting in a more enhancement in adhesiveness of a chemical conversion film. On the other hand, the content of the silane coupling agent can be 5 parts by mass or less, resulting in suppression of deterioration in storage stability of the water-based treatment solution.

1-6. Characteristics of Water-Based Treatment Solution

The content (solid concentration) of a solid except for a solvent such as water in the water-based treatment solution is preferably 20 mass % or more based on the total mass of the water-based treatment solution. The content of the solid can be 20 mass % or more, thereby allowing for formation of a chemical conversion film having a sufficient thickness and having sufficient weather resistance. The upper limit of the content of the solid is preferably 40 mass % or less in terms of stability of the treatment solution.

The pH of the water-based treatment solution is preferably 7.0 or more and 9.5 or less. The pH can be 7.0 or more, resulting in proper adjustment of the amount of etching of Zn, and the pH can be 9.5 or less, resulting in proper adjustment of the amount of etching of Al. Thus, the pH can be 7.0 or more and 9.5 or less, resulting in suppression of any poor appearance or deterioration in corrosion resistance due to excessive etching.

The water-based treatment solution may be a one-liquid solution or a two-liquid mixed solution that is obtained by mixing, in use, the emulsion of the fluororesin with the solution (or dispersion) including the binding promoter.

2. Method for Chemical Conversion Treatment of Steel Sheet or Plated Steel Sheet The above water-based treatment solution can be used in a chemical conversion treatment of a steel sheet or a plated steel sheet. Specifically, a chemical conversion film can be formed by applying the water-based treatment solution to the surface of a steel sheet or a plated steel sheet, and drying the resultant.

The type of the steel sheet is not particularly limited. For example, the steel sheet may be a carbon steel including a low-carbon steel, a medium-carbon steel, a high-carbon steel, and the like, or may be an alloy steel containing Mn, Cr, Si, Ni, and the like. The steel sheet may be a killed steel including an Al killed steel and the like, or may be a rimmed steel. In the case where favorable press formability is required, a preferable steel sheet is a steel sheet for deep drawing, including a low-carbon Ti-added steel, a low-carbon Nb-added steel, and the like. A high-strength steel sheet where the amounts of P, Si, Mn, and the like are adjusted to specified values may also be used.

The plated steel sheet may be any one obtained by using the steel sheet as a substrate steel sheet and subjecting it to known plating. The plating may be hot-dip plating or vapor deposition plating. The type of the plating is not particularly limited, and any of Zn-based plating (for example, Zn plating, Zn—Al plating, and Zn—Al—Mg plating), Al-based plating. Ni-based plating, and the like can be used. In particular, Zn-based plating and Al-based plating are preferable, and Zn-based plating is more preferable.

The steel sheet or plated steel sheet may be any of processed articles such as a round tube, a square tube, a C-channel, an H-shaped steel, and an L-shaped steel.

In particular, the above water-based treatment solution can allow for formation of a chemical conversion film high in adhesiveness to both each plated layer and a substrate steel sheet, and thus a chemical conversion film is preferably formed by applying the solution to a region of a substrate steel sheet for the plated steel sheet, the region being exposed by processing or the like, and drying the resultant. Examples of the processing include drawing, bending, roll forming, shearing, welding, and spraying.

For example, in the case of production of a welded steel tube, a sprayed repair layer may be formed by processing a plated steel sheet into an open pipe by roll forming, thereafter welding an end of the plated steel sheet in the width direction, then cutting a bead protrusion protruded from a welded steel tube, and thereafter forming a repair layer on a welded portion bead-cut. In the case of formation of a sprayed repair layer as above, the spraying method and the spraying material are not particularly limited, and, for example, double spraying of Al and Zn, or triple spraying of Al, Zn and Al can be adopted.

A welded portion obtained by melting and welding a plated layer, where a substrate steel sheet is exposed in a relatively broad area, is thus deteriorated in sacrificial anticorrosion effect by the plated layer and easily deteriorated in corrosion resistance. In particular, in the case where a chemical conversion film is formed by applying the water-based treatment solution to such a welded portion and drying the resultant, the effect of enhancing corrosion resistance is remarkably exerted.

The steel sheet or a plated steel sheet may be subjected to an underlying chemical conversion treatment by pre-coating, according to a known method.

The method of coating with the water-based treatment solution is not particularly limited, and may be appropriately selected depending on the shape of the steel sheet or the plated steel sheet. Examples of the coating method include a roll coating method, a curtain coating method, a spin coating method, a spray coating method, a dip-pulling method, and a dropping method. The thickness of a liquid film of the water-based treatment solution can be adjusted by felt drawing, an air wiper, or the like.

The amount of coating with the water-based treatment solution is not particularly limited, and is preferably adjusted so that the thickness of a chemical conversion film is 0.5 μm or more and 10 μm or less. The thickness of a chemical conversion film can be 0.5 μm or more, thereby allowing weather resistance, corrosion resistance, discoloration resistance, and the like to be sufficiently imparted to the chemical conversion film. On the other hand, even a thickness of more than 10 μm cannot allow any enhancement in performance according to an increase in thickness to be expected.

The water-based treatment solution applied can be dried at ordinary temperature and thus formed into a chemical conversion film. The water-based treatment solution applied may be here dried by heating (for example, heating to 50° C. or more), and the drying temperature here is preferably 300° C. or less from the viewpoint of suppression of deterioration in performance of a chemical conversion film due to pyrolysis of an organic component. The drying is here preferably made at ordinary temperature from the viewpoint of easier formation of a chemical conversion film in an exposed region of a substrate steel sheet, generated at a processing site or the like by cutting of the steel sheet or the plated steel sheet, processing of the plated steel sheet, or the like.

3. Chemical-Conversion-Treated Steel Sheet

A chemical-conversion-treated steel sheet having a chemical conversion film formed from the above water-based treatment solution includes the above steel sheet or plated steel sheet, and the chemical conversion film formed on the surface of the steel sheet or plated steel sheet.

More specifically, the chemical conversion film includes the organic resin including the fluororesin, the above compound containing group 4 element, and at least one binding promoter selected from the group consisting of dimethyl adipate, diethyl adipate, di(iso)propyl adipate, di(iso)butyl adipate, dimethyl phthalate, diethyl phthalate, di(iso)propyl phthalate, and di(iso)butyl phthalate.

The content ratio of such components is the same as the ratio described above with respect to the water-based treatment solution.

The thickness of the chemical conversion film is preferably 0.5 m or more and 10 μm or less. The thickness can be 0.5 μm or more, thereby allowing weather resistance, corrosion resistance, discoloration resistance, and the like to be sufficiently imparted to the chemical conversion film. On the other hand, even a thickness of more than 10 μm cannot allow any enhancement in performance according to an increase in thickness to be expected.

The chemical-conversion-treated steel sheet is excellent in weather resistance, in particular, long-term weather resistance. A chemical-conversion-treated steel sheet, which includes the chemical conversion film in an exposed region of a substrate steel sheet, generated by processing or the like of a plated steel sheet, is preferable because it is excellent in weather resistance, in particular, long-term weather resistance of the chemical conversion film in the exposed region of a substrate steel sheet. As described above, a chemical-conversion-treated steel sheet, which includes the chemical conversion film in a welded portion obtained by melting and welding a plated layer, allows the effect of enhancing corrosion resistance of the welded portion to be remarkably exerted.

EXAMPLES

Hereinafter, the present invention will be described in detail with reference to Examples, but the present invention is not limited by such Examples.

1. Preparation of Water-Based Treatment Solution

Respective components were mixed to prepare water-based treatment solution 1 to water-based treatment solution 19 shown in Table 1.

The fluororesin (FR) here used was a water-based emulsion of a fluororesin (Tg: −35 to 25° C., minimum film formation temperature (MFT): 10° C., FR). The solid concentration of the fluororesin emulsion was 38 mass %, the content of a fluorine atom in the fluororesin was 25 mass %, and the average particle size of the emulsion was 150 nm.

The acrylic resin (AR) here prepared was an acrylic resin emulsion, "Patelacol" manufactured by DIC Corporation ("Patelacol" being a registered trademark of the Company). The solid concentration of "Patelacol" appeared to be 40 mass %, and the average particle size of the emulsion appeared to be about 10 to 100 nm.

The urethane resin (PU) here used was a urethane resin emulsion, "Hydran" manufactured by DIC Corporation. The solid concentration of "Hydran" appeared to be 35 mass %, and the average particle size of the emulsion appeared to be about 10 to 100 nm.

The amount of phosphoric acid in the etching agent was adjusted as the total amount of phosphoric acid, diammonium hydrogen phosphate and ammonium dihydrogen phosphate, and the amount of ammonium in the etching agent was adjusted as the total amount of ammonia (aqueous solution), zirconium ammonium carbonate, zirconium ammonium fluoride, diammonium hydrogen phosphate, ammonium dihydrogen phosphate and ammonium carbonate.

In Table 1, "Amount of F", "Amount of Zr", "Amount of addition", "Amount of phosphoric acid" and "Amount of ammonium" represent the amount (mass %) of a fluorine atom, the amount (g/L) of the compound containing group 4 element in terms of metal, the amount (g/L) of the binding promoter added, the content (g/L) of the phosphoric acid or phosphate in terms of phosphate anion, and the content (g/L) of the ammonia or ammonium salt in terms of quaternary ammonium cation, respectively.

In the case where "FR/AR" is described in "Type" of "Organic resin" in Table 1, it is indicated that the amount of the solid in the water-based treatment solution obtained by blending the fluororesin and the acrylic resin and combining the resultant with other compound is adjusted so as to be a numerical value described in "Amount of solid" and the amount of a fluorine atom is adjusted so as to be a numerical value described in "Amount of F".

TABLE 1

| Treatment solution No. | Organic resin | | Group 4A metal compound | | Binding promoter | | Etching agent | | Characteristics of treatment solution | |
|---|---|---|---|---|---|---|---|---|---|---|
| | Type | Amount of F (wt %) | Component | Amount of Zr (g/L) | Component | Amount of addition (g/L) | Amount of phosphoric acid (g/L) | Amount of ammonium (g/L) | pH | Solid (%) |
| 1 | FR/AR | 5.0 | Fluorozirconic acid | 3.0 | Diethyl adipate | 5.0 | — | — | 7.8 | 20 |
| 2 | FR/AR | 7.0 | Fluorozirconic acid | 3.0 | Diethyl adipate | 5.0 | — | — | 7.8 | 20 |
| 3 | FR/AR | 13.0 | Fluorozirconic acid | 3.0 | Diethyl adipate | 5.0 | — | — | 7.8 | 20 |

TABLE 1-continued

| Treatment solution No. | Organic resin Type | Amount of F (wt %) | Group 4A metal compound Component | Amount of Zr (g/L) | Binding promoter Component | Amount of addition (g/L) | Etching agent Amount of phosphoric acid (g/L) | Amount of ammonium (g/L) | Characteristics of treatment solution pH | Solid (%) |
|---|---|---|---|---|---|---|---|---|---|---|
| 4 | FR/AR | 13.0 | Fluorozirconic acid | 1.0 | Diethyl adipate | 3.0 | — | — | 7.8 | 20 |
| 5 | FR/AR | 13.0 | Fluorozirconic acid | 3.0 | Diethyl adipate | 0.4 | — | — | 7.8 | 20 |
| 6 | FR/AR | 13.0 | Zirconium ammonium fluoride | 3.0 | Diethyl adipate | 3.0 | — | 3.0 | 8.0 | 20 |
| 7 | FR/AR | 13.0 | Zirconium ammonium carbonate | 3.0 | Diethyl adipate | 3.0 | — | 3.0 | 8.0 | 20 |
| 8 | FR/AR | 13.0 | Fluorozirconic acid | 3.0 | Diethyl adipate | 3.0 | 3.0 | — | 7.8 | 20 |
| 9 | FR/AR | 13.0 | Zirconium ammonium fluoride | 3.0 | Diethyl adipate | 3.0 | 3.0 | 2.3 | 8.2 | 20 |
| 10 | FR/AR | 13.0 | Zirconium ammonium carbonate | 3.0 | Diethyl adipate | 3.0 | 3.0 | 2.3 | 8.2 | 20 |
| 11 | FR/AR | 13.0 | Zirconium ammonium fluoride | 5.0 | Dibutyl adipate | 3.0 | 3.0 | 2.3 | 8.2 | 20 |
| 12 | FR/AR | 13.0 | Fluorozirconic acid | 3.0 | Dimethyl adipate | 3.0 | 3.0 | 2.3 | 8.2 | 20 |
| 13 | FR/AR | 20.0 | Zirconium ammonium carbonate | 5.0 | Diethyl adipate | 5.0 | 3.0 | 3.1 | 8.5 | 20 |
| 14 | FR/AR | 25.0 | Zirconium ammonium carbonate | 6.0 | Diethyl adipate | 20.0 | 6.0 | 4.7 | 8.8 | 20 |
| 15 | PU | — | Zirconium ammonium carbonate | 3.0 | Diethyl adipate | 5.0 | — | — | 7.8 | 20 |
| 16 | AR | — | Zirconium ammonium carbonate | 3.0 | Diethyl adipate | 5.0 | — | — | 7.8 | 20 |
| 17 | FR | 13.0 | — | — | Diethyl adipate | 5.0 | — | — | 7.8 | 20 |
| 18 | FR | 13.0 | Zirconium ammonium carbonate | 3.0 | — | — | — | — | 7.8 | 20 |
| 19 | FR/AR | 13.0 | Zirconium ammonium carbonate | 3.0 | Diethyl phthalate | 3.0 | 3.0 | 2.3 | 8.2 | 20 |

2. Substrate Metal Sheet

Metal sheet a to metal sheet e shown in Table 2 were prepared.

Metal sheet a was a steel sheet made of a plain steel having a thickness of 0.8 mm. A film was formed on the surface of the steel sheet by use of the water-based treatment solution.

Metal sheet b was a welded plated steel sheet obtained by welding plated steel sheets each including a hot-dip Zn-0.18 mass %/Al-plated layer (amount of plating attached: 60 g/m$^2$) formed on the surface of a plain steel having a thickness of 0.8 mm. A film was formed on a portion of a welded portion, where a substrate steel sheet was exposed, by use of the water-based treatment solution.

Metal sheet c was a welded plated steel sheet obtained by welding plated steel sheets each including a hot-dip Zn-6.0 mass %/Al-3.0 mass %/Mg-plated layer (amount of plating attached: 60 g/m$^2$) formed on the surface of a plain steel having a thickness of 0.8 mm. After welding, a welded portion was subjected to double spraying of Al—Zn to form a sprayed repair portion, and a film was formed on the sprayed repair portion, by use of the water-based treatment solution.

Metal sheet d was a processed-plated steel sheet obtained by bending a plated steel sheet including a hot-dip Zn-6.0 mass %/Al-3.0 mass %/Mg-plated layer (amount of plating attached: 60 g/m$^2$) formed on the surface of a plain steel having a thickness of 0.8 mm. A plated layer was broken by processing and a steel sheet was partially exposed, in a processed portion of metal sheet d. The percentage of the steel sheet exposed was determined as $(X/Y) \times 100$ under assumption that a linear region was arbitrarily provided on the processed portion and the length of the steel material after bending was defined as Y and the total length of a portion of the steel sheet, exposed by the bending, was defined as X. The percentage of the steel sheet exposed was found to be 20%. A film was formed on the processed portion, by use of the water-based treatment solution.

Metal sheet e was a plated steel sheet including a hot-dip Zn-6.0 mass %/Al-3.0 mass %/Mg-plated layer (amount of plating attached: 60 g/m$^2$) formed on the surface of a plain steel having a thickness of 0.8 mm. A film was formed on a portion on an edge face of the plated steel sheet, where a substrate steel sheet was exposed, by use of the water-based treatment solution.

TABLE 2

| Metal sheet No. | Substrate metal sheet | Thickness (mm) | Evaluated region |
|---|---|---|---|
| a | Plain steel | 0.8 | Flat portion |
| b | Hot-dip Zn-0.18 mass %/Al-plated steel sheet | 0.8 | Welded portion |
| c | Hot-dip Zn-6 mass %/Al-3 mass %/Mg-plated steel sheet | 0.8 | Sprayed repair portion (double spraying of Al → Zn) |
| d | | 0.8 | Processed portion (percentage of steel sheet exposed: 20%) |
| e | | 0.8 | Edge face |

3. Formation of Film

Each evaluated region described above of metal sheet a to metal sheet e was coated with any of water-based treatment solution 1 to water-based treatment solution 19, and the water-based treatment solution for coating was dried at any temperature shown in the following Table, to thereby form each film.

4. Evaluation-1

A test piece including the evaluated region was cut out from metal sheet a, and a film formed on the test piece was evaluated with respect to adhesiveness, weather resistance and corrosion resistance, according to the following criteria.

4-1. Adhesiveness

After the test piece was subjected to 4t bending, the peeling area ratio (PA) of the film in a cellophane tape peeling test was measured, and the adhesiveness was evaluated according to the following criteria.

A: the peeling area ratio of the film was 5% or less
B: the peeling area ratio of the film was more than 5% and 10% or less
C: the peeling area ratio of the film was more than 10% and 50% or less
D: the peeling area ratio of the film was more than 500%

4-2. Weather Resistance

An accelerated weather resistance test (xenon lamp method) was performed according to JIS K 5600-7-7:2008. In the present test method, a process involving spraying with water for 18 minutes during irradiation with light from a xenon arc lamp for 120 minutes was defined as 1 cycle (2 hours). The gloss level was measured after such a test for 100 cycles, the measurement value after the test was compared with the gloss level before the test to calculate the gloss retention rate ($R_{G60}$), and the weather resistance was evaluated according to the following criteria.

A: the gloss retention rate was 90% or more
B: the gloss retention rate was 80% or more and less than 90%
C: the gloss retention rate was 60% or more and less than 80%
D: the gloss retention rate was less than 60%

4-3. Corrosion Resistance

The edge face of the test piece was sealed, and exposed to the air for one month after the accelerated weather resistance test for 400 cycles. The area ratio of red rust generated on the surface of the test piece was measured to determine the area ratio of red rust (WR), and the corrosion resistance was evaluated according to the following criteria.

A: the area ratio of red rust was 10% or less
B+: the area ratio of red rust was more than 10% and 20% or less
B−: the area ratio of red rust was more than 20% and 30% or less
C: the area ratio of red rust was more than 30% and 50% or less
D: the area ratio of red rust was more than 50%

4-4. Storage Stability

Water-based treatment solution 1 to water-based treatment solution 19 were each stored at ordinary temperature for 180 days. The amount of change in viscosity before and after storage of each of the water-based treatment solutions (value obtained by subtracting the viscosity before the storage from the viscosity after the storage) was measured by Ford Cup No. 4, and the storage stability was evaluated according to the following criteria.

A: the amount of change in viscosity was less than 10 seconds
B: the amount of change in viscosity was 10 seconds or more, but no problems were caused in use
C: the amount of change in viscosity was 30 seconds or more, and coating was made difficult by thickening The drying temperature, the film thickness, and the adhesiveness, weather resistance and corrosion resistance, in coating with each of water-based treatment solution 1 to water-based treatment solution 19, are shown in Table 3.

TABLE 3

| | | | | | Evaluation results of quality | | | | | |
|---|---|---|---|---|---|---|---|---|---|---|
| | Metal | Treatment solution | Drying temperature | Thickness | Adhesiveness | | Weather resistance | | Corrosion resistance (flat portion) | | Storage stability |
| | sheet | No. | (° C.) | (μm) | PA % | Rating | $R_{G60}$ | Rating | WR % | Rating | Rating |
| Present invention | a | 1 | Ordinary temperature | 2 | 0 | A | 80 | B | 20 | B+ | A |
| Present invention | a | 2 | Ordinary temperature | 2 | 0 | A | 85 | B | 18 | B+ | A |
| Present invention | a | 3 | Ordinary temperature | 2 | 0 | A | 92 | A | 15 | B+ | A |
| Present invention | a | 4 | Ordinary temperature | 2 | 7 | B | 92 | A | 15 | B+ | A |
| Present invention | a | 5 | Ordinary temperature | 2 | 0 | A | 92 | A | 28 | B− | A |
| Present invention | a | 6 | Ordinary temperature | 2 | 0 | A | 92 | A | 12 | B+ | A |
| Present invention | a | 7 | Ordinary temperature | 2 | 0 | A | 92 | A | 12 | B+ | A |
| Present invention | a | 8 | Ordinary temperature | 2 | 0 | A | 92 | A | 12 | B+ | A |
| Present invention | a | 9 | Ordinary temperature | 2 | 0 | A | 92 | A | 5 | A | A |
| Present invention | a | 10 | Ordinary temperature | 2 | 0 | A | 92 | A | 5 | A | A |
| Present invention | a | 11 | Ordinary temperature | 2 | 0 | A | 92 | A | 5 | A | A |
| Present invention | a | 12 | Ordinary temperature | 2 | 0 | A | 92 | A | 5 | A | A |
| Present invention | a | 13 | Ordinary temperature | 2 | 0 | A | 95 | A | 2 | A | A |

TABLE 3-continued

| | Metal sheet | Treatment solution No. | Drying temperature (° C.) | Thickness (μm) | Adhesiveness PA % | Adhesiveness Rating | Weather resistance $R_{G60}$ | Weather resistance Rating | Corrosion resistance (flat portion) WR % | Corrosion resistance (flat portion) Rating | Storage stability Rating |
|---|---|---|---|---|---|---|---|---|---|---|---|
| Present invention | a | 14 | Ordinary temperature | 2 | 0 | A | 97 | A | 2 | A | B |
| Present invention | a | 19 | Ordinary temperature | 2 | 0 | A | 92 | A | 5 | A | A |
| Comparative Example | a | 15 | Ordinary temperature | 2 | 0 | A | 40 | D | 90 | D | A |
| Comparative Example | a | 16 | Ordinary temperature | 2 | 0 | A | 65 | C | 90 | D | A |
| Comparative Example | a | 17 | Ordinary temperature | 2 | 30 | D | 92 | A | 32 | C | A |
| Comparative Example | a | 18 | Ordinary temperature | 2 | 0 | A | 92 | A | 48 | C | A |

Each chemical conversion film formed by use of water-based treatment solution 1 to water-based treatment solution 14 and water-based treatment solution 19 each including the organic resin including the fluororesin, the compound containing group 4 element, and the binding promoter was favorable in all the adhesiveness, weather resistance and corrosion resistance of the chemical conversion film.

In particular, each chemical conversion film formed by use of water-based treatment solution 3 to water-based treatment solution 14 and water-based treatment solution 19 each including 8 mass % or more of a fluorine (F) atom based on the total mass of the fluororesin was tended to be higher in weather resistance and higher in corrosion resistance.

In addition, each chemical conversion film formed by use of water-based treatment solution 1 to water-based treatment solution 3, water-based treatment solution 5 to water-based treatment solution 14 and water-based treatment solution 19, in which the content of the compound containing group 4 element in the water-based treatment solution, in terms of metal, was 2 g/L or more, was higher in adhesiveness.

In addition, each chemical conversion film formed by use of water-based treatment solution 1 to water-based treatment solution 4, water-based treatment solution 6 to water-based treatment solution 14 and water-based treatment solution 19, in which the content of the binding promoter was 0.5 g/L or more and 50 g/L or less, was higher in corrosion resistance. In addition, water-based treatment solution 1 to water-based treatment solution 4, water-based treatment solution 6 to water-based treatment solution 13 and water-based treatment solution 19, in which the content of the binding promoter was 20 g/L or less, were each high in storage stability even in the case of one-component solution.

In addition, each chemical conversion film formed by use of water-based treatment solution 6 to water-based treatment solution 14 and water-based treatment solution 19 each including the etching agent tended to be higher in corrosion resistance, and each chemical conversion film formed by use of water-based treatment solution 9 to water-based treatment solution 14 and water-based treatment solution 19 each including both phosphoric acid or phosphate and ammonia or an ammonium salt in the etching agent was further high in corrosion resistance.

On the other hand, each chemical conversion film formed by use of water-based treatment solution 15 and water-based treatment solution 16 each including other resin than the fluororesin was low in weather resistance and corrosion resistance.

In addition, a chemical conversion film formed by use of water-based treatment solution 17 including no compound containing group 4 element was low in adhesiveness.

In addition, a chemical conversion film formed by use of water-based treatment solution 18 including no binding promoter was low in corrosion resistance.

5. Evaluation-2

Each test piece including the evaluated region was cut out from metal sheet b to metal sheet e, and a film formed on the test piece was evaluated with respect to corrosion resistance, according to the following criteria.

5-1. Corrosion Resistance 2

An accelerated weather resistance test (xenon lamp method) was performed according to JIS K 5600-7-7:2008. In the present test method, a process involving spraying with water for 18 minutes during irradiation with light from a xenon arc lamp for 120 minutes was defined as 1 cycle (2 hours). After the accelerated weather resistance test for 100 cycles, the test piece was exposed to the air for one month. The area ratio of red rust generated on the surface of the test piece was measured to determine the area ratio of red rust (WR), and the corrosion resistance was evaluated according to the following criteria.

A: the area ratio of red rust was 10% or less
B+: the area ratio of red rust was more than 10% and 20% or less
B−: the area ratio of red rust was more than 20% and 30% or less
C: the area ratio of red rust was more than 30% and 500 or less
D: the area ratio of red rust was more than 50%

The drying temperature, the film thickness, and the corrosion resistance, in coating with each of water-based treatment solution 1 to water-based treatment solution 18, are shown in Table 4.

TABLE 4

| | Treatment solution No. | Drying temperature (° C.) | Thickness (μm) | Corrosion resistance (welded portion) Substrate | WR % | Rating | Corrosion resistance (sprayed portion) Substrate | WR % | Rating | Corrosion resistance (processed portion) Substrate | WR % | Rating | Corrosion resistance (edge face portion) Substrate | WR % | Rating |
|---|---|---|---|---|---|---|---|---|---|---|---|---|---|---|---|
| Present invention | 1 | Ordinary temperature | 2 | b | 22 | B− | c | 8 | A | d | 7 | A | e | 7 | A |
| Present invention | 2 | Ordinary temperature | 2 | b | 15 | B+ | c | 5 | A | d | 5 | A | e | 6 | A |
| Present invention | 3 | Ordinary temperature | 2 | b | 15 | B+ | c | 5 | A | d | 3 | A | e | 4 | A |
| Present invention | 4 | Ordinary temperature | 2 | b | 15 | B+ | c | 5 | A | d | 3 | A | e | 4 | A |
| Present invention | 5 | Ordinary temperature | 2 | b | 23 | B− | c | 5 | A | d | 3 | A | e | 5 | A |
| Present invention | 6 | Ordinary temperature | 2 | b | 10 | B+ | c | 5 | A | d | 3 | A | e | 5 | A |
| Present invention | 7 | Ordinary temperature | 2 | b | 10 | B+ | c | 5 | A | d | 3 | A | e | 5 | A |
| Present invention | 8 | Ordinary temperature | 2 | b | 10 | B+ | c | 5 | A | d | 3 | A | e | 5 | A |
| Present invention | 9 | Ordinary temperature | 2 | b | 4 | A | c | 2 | A | d | 0 | A | e | 2 | A |
| Present invention | 10 | Ordinary temperature | 2 | b | 4 | A | c | 2 | A | d | 0 | A | e | 2 | A |
| Present invention | 11 | Ordinary temperature | 2 | b | 4 | A | c | 2 | A | d | 0 | A | e | 2 | A |
| Present invention | 12 | Ordinary temperature | 2 | b | 4 | A | c | 2 | A | d | 0 | A | e | 2 | A |
| Present invention | 13 | Ordinary temperature | 2 | b | 1 | A | c | 0 | A | d | 0 | A | e | 1 | A |
| Present invention | 14 | Ordinary temperature | 2 | b | 1 | A | c | 0 | A | d | 0 | A | e | 1 | A |
| Comparative Example | 15 | Ordinary temperature | 2 | b | 90 | D | c | 40 | C | d | 90 | D | e | 90 | D |
| Comparative Example | 16 | Ordinary temperature | 2 | b | 90 | D | c | 35 | C | d | 85 | D | e | 90 | D |
| Comparative Example | 17 | Ordinary temperature | 2 | b | 35 | C | c | 5 | A | d | 5 | A | e | 35 | A |
| Comparative Example | 18 | Ordinary temperature | 2 | b | 40 | C | c | 5 | A | d | 5 | A | e | 40 | A |

Each chemical conversion film formed by use of water-based treatment solution 1 to water-based treatment solution 14 each including the organic resin including the fluororesin, the compound containing group 4 element, and the binding promoter was favorable in all the adhesiveness, weather resistance and corrosion resistance of the chemical conversion film with respect to the welded portion, sprayed portion, processed portion and edge face portion.

The present application is an application that claims the priority based on Japanese Patent Application No. 2017-087331 filed on Apr. 26, 2017, and the contents described in the claims and the specification of such an application are herein incorporated.

INDUSTRIAL APPLICABILITY

A chemical conversion film produced by the water-based treatment solution of the present invention can be more enhanced in corrosion resistance with respect to each region of a steel sheet and a plated steel sheet, in particular, a plated steel sheet, where a substrate steel sheet is exposed by processing or the like. For example, the water-based treatment solution of the present invention can be suitably used for formation of a chemical conversion film by post-coating of a steel sheet or a plated steel sheet for use in applications such as 1) steel tubes, shaped steels, support posts, beams, and conveyance members for green houses or agricultural houses, 2) sound insulation walls, soundproof walls, sound absorbing walls, snow barriers, guard rails, bridge railing, protective fence, and support posts, and 3) railroad car members, rail members, members for electric installation, members for environmental safety, structural members, and solar mounts.

What is claimed is:

1. A water-based treatment solution for a chemical conversion treatment of a steel sheet or a plated steel sheet, the water-based treatment solution comprising:
    an organic resin comprising a fluororesin,
    a compound containing group 4 element, and
    at least one binding promoter selected from the group consisting of dimethyl adipate, diethyl adipate, di(iso)propyl adipate, di(iso)butyl adipate, dimethyl phthalate, diethyl phthalate, di(iso)propyl phthalate, and di(iso)butyl phthalate.

2. The water-based treatment solution according to claim 1, wherein the fluororesin comprises 8 mass % or more of a fluorine atom based on a total mass of the fluororesin.

3. The water-based treatment solution according to claim 1, wherein a content of the compound containing group 4 element is 2 g/L or more in terms of metal.

4. The water-based treatment solution according to claim 1, wherein a content of the binding promoter is 0.5 g/L or more and 50 g/L or less.

5. The water-based treatment solution according to claim 1, further comprising an etching agent selected from the group consisting of phosphoric acid phosphate, ammonia, and ammonium salt.

6. The water-based treatment solution according to claim 5, wherein the etching agent comprises a combination at least one of phosphoric acid and phosphate with at least one of ammonia and an ammonium salt.

7. The water-based treatment solution according to claim 6, wherein a content of the phosphoric acid or phosphate is 1 g/L or more in terms of phosphate anion ($PO_4^{3-}$), and a content of the ammonia or ammonium salt is 1 g/L or more in terms of quaternary ammonium cation ($NH_4^+$).

8. The water-based treatment solution according to claim 1, wherein a content of a solid is 20% or more.

9. The water-based treatment solution according to claim 1, having a pH of 7.0 or more and 9.5 or less.

10. A method for chemical conversion treatment of a steel sheet or a plated steel sheet, the method comprising
    applying the water-based treatment solution according to claim 1 to a surface of a steel sheet or a plated steel sheet.

11. The chemical conversion treatment method according to claim 10, wherein the water-based treatment solution is applied to an exposed region of a substrate steel sheet for the plated steel sheet.

12. A chemical-conversion-treated steel sheet, comprising:
    a steel sheet or a plated steel sheet; and
    a chemical conversion film formed on a surface of the steel sheet or the plated steel sheet, wherein
    the chemical conversion film comprises:
    an organic resin comprising a fluororesin;
    a compound containing group 4 element; and
    at least one binding promoter selected from the group consisting of dimethyl adipate, diethyl adipate, di(iso)propyl adipate, di(iso)butyl adipate, dimethyl phthalate, diethyl phthalate, di(iso)propyl phthalate, and di(iso)butyl phthalate.

13. The chemical-conversion-treated steel sheet according to claim 12, wherein the chemical conversion film is formed in an exposed region of a substrate steel sheet for the plated steel sheet.

* * * * *